United States Patent [19]

Farias

[11] Patent Number: 6,004,488
[45] Date of Patent: *Dec. 21, 1999

[54] CONTINUOUS PROCESS FOR THE MANUFACTURE OF TUBULAR FOOD CASINGS

[75] Inventor: Ignacio Lopez Farias, Zacapu, Mexico

[73] Assignee: Celanese Mexicana, S.A., Av. Revolucion No. 1425, Mexico

[ * ] Notice: This patent is subject to a terminal disclaimer.

[21] Appl. No.: 08/239,674

[22] Filed: May 9, 1994

[30] Foreign Application Priority Data

Jul. 14, 1993 [MX] Mexico .................................... 934245

[51] Int. Cl.$^6$ ............................ B29C 47/20; D01F 02/06
[52] U.S. Cl. .................. 264/37.2; 264/188; 264/211.11; 426/138; 426/277
[58] Field of Search ............................ 264/188, 211.11, 264/217, 218, 37.2; 426/138, 277

[56] References Cited

U.S. PATENT DOCUMENTS

| | | | |
|---|---|---|---|
| 1,908,892 | 5/1933 | Dietrich et al. | 264/188 |
| 3,247,037 | 4/1966 | Shiner et al. | 264/188 |
| 3,388,197 | 6/1968 | Samways | 264/188 |
| 3,562,368 | 2/1971 | Bridgeford | 264/188 |
| 3,619,223 | 11/1971 | Brower | 106/165 |
| 3,669,791 | 6/1972 | Bridgeford | 264/188 |
| 3,787,552 | 1/1974 | Spencer et al. | 264/209.1 |
| 4,164,536 | 8/1979 | Bentley | 264/188 |
| 4,195,054 | 3/1980 | Verellen et al. | 264/558 |
| 4,317,794 | 3/1982 | Gord et al. | 264/559 |
| 5,597,587 | 1/1997 | Nicholson et al. | 264/188 |

*Primary Examiner*—Jan H. Silbaugh
*Assistant Examiner*—Mark Eashoo
*Attorney, Agent, or Firm*—Gregory N. Clements

[57] ABSTRACT

An improved continuous process for the manufacture of tubular food casings, which allows for the regeneration of casing without an interruption of the process to drive out liquids and gases produced during coagulation and regeneration of the casing, characterized by the steps of: extruding an alkaline viscose solution through an extrusion die within a coagulation bath; coagulating and regenerating the viscose solution thereby producing gases and extruding a tubular casing whereby the gases are entrapped within the casing; inducing a countercurrent flow of gases entrapped within the casing opposite the extrusion direction; and continuously venting the gases through an orifice within the extrusion die. This process permits the non-interrupted extrusion and regeneration of tubular food casings associated with the prior art wherein the process is frequently interrupted to allow exhaustion of liquids and gases.

6 Claims, 3 Drawing Sheets

CONTINUOUS PROCESS FOR THE MANUFACTURE OF TUBULAR FOOD CASINGS

FIELD OF THE INVENTION

This invention relates to a new and improved continuous process for the manufacture of tubular food casings, such as artificial casings and the like.

PRIOR ART

Processes for the manufacture of artificial sausage casings made entirely of regenerated cellulose, are well known.

U.S.A. patent literature in the art shows many references disclosing processes which comprise extruding viscose, which is a solution of sodium cellulose xanthate in caustic soda through an orifice into a coagulating bath to form said casings.

The oldest U.S. Patent known is Dietrich et al. U.S. Pat. No. 1,908,892 which describes the steps of manufacturing a tubular casing, by extruding above mentioned viscose through an annular die into an spinning bath containing a mixture of sulfuric acid and sodium sulfate or ammonium sulfate or equivalent coagulating and regenerating agents. As the viscose passes through the spinning bath, it is coagulated and partially regenerated, forming a continuous cellulose tube or casing.

U.S. Pat. No. 2,999,756, U.S. Pat. No. 2,999,757 together with U.S. Pat. No. 3,835,113 disclose what is considered as the basic viscose processes.

One of the most important technical challenges which are present during the coagulation and regeneration steps above mentioned, is the venting operation of the fluids produced during said steps. As a result of the chemical reaction between the cellulose xanthate and the sulfuric acid, said xanthate is decomposed evolving gaseous carbon disulfide ($CS_2$). Additional gases are produced from a secondary chemical reaction with the sulfuric acid, in the form of sulfhydric acid ($H_2S$). These gases are entrapped within the tubular casing and, inflate the same. In addition to the gases, an important amount of water is produced due to the viscose dehydration and said chemical reaction. Both, the gases and the water, must be released from the casing in order to prevent same from bursting.

In the past, several attempts have been done in order to solve the above mentioned problem. It was practice to release the entrapped fluids by puncturing the tubular casing. Therefore, the casing was cut periodically producing a slit type opening.

Since the extruded tubular casing has to continue through a series of water wash, desulfuring, water wash and plastification steps and then dried in an inflated state, the tubular casing must be free of punctures of any kind.

Because of the above, it was also a practice to cut out that section of the tubular casing having the puncture, prior to the drying step. After this cutting operation, it was necessary to connect together the cut ends for which purpose a flexible tube of coupling was inserted into a cut end of the tubular casing and the other cut end was slipped over the first end containing the short tube coupling. To further reinforce the connection, a winding and knotting string was formed over the connected sections. By these means, it was possible to dry the tubular casing in an inflated state, however, this approach represented a huge time loss and discontinuity in the entire manufacture process. To make things worse, the connection had to be removed before the reeling step of the process, which is performed in a flattened state after the drying. By these cutting, connecting and cutting again operations, a great amount of time, casing material and labor are lost.

Another approach made in the past, consists in performing patching operations on the regenerated cellulose tubular casing having the slit type opening. This is a difficult task because of the extremely high moisture content of the tubular casing and the high internal pressures the path has to resist. U.S. Pat. No. 3,247,037 to Shiner et al, discloses an attempt to patch wet cellulose by means of a flexible material patch secured with a water-soluble polyvinyl alcohol, however, this alternative was unsatisfactory due to the slow rate of development of the adhesive strength and the difficulty of application.

U.S. Pat. No. 3,562,368 (1971) and its Divisional Pat. No. 3,669,791 (1972) to D. S. Bridgeford, describe a method of venting fluids from artificial tubular casings made by the viscose process, which comprises perforating multiple small holes in a discrete area of the cellulose xanthate casing during regeneration thereof. The holes are later filled with a suitable liquid, gel-forming dope (e.g. a 16% cellulose, low degree of polymerization, viscose) or with a solid suspension or slurry of water swellable material (e.g., low alkali unregenerated cellulose xanthate) in a water-miscible organic solvent (e.g. acetone) or by securing a solid film patch, such as, cellulose onto the gel casing with an adhesive, such as, alphacyanomethyl acrylate monomer.

The above mentioned U.S. patents represent the closets prior art related to this invention. Even though, it may be assumed that said patents provide a method for accomplishing their objects of perforating small venting holes in cellulose tubular casings and to seal said holes in wet casings, with a seal capable of retaining the inflated air in the casing and resistant to the shearing forces encountered during the drying of the casing, with a reduced interruption of the manufacture process and also with a reduced wastage of casing material, said method is not completely satisfactory for the continuous manufacture of casings because same still maintains interruptions, waste of material, high need of labor and the addition of odd aggregates, which should be finally eliminated.

Therefore, there is still a need for a continuous, efficient and economical process for the manufacture of tubular food casings, such as artificial sausage casings and the like.

OBJECTS OF THE INVENTION

The main object of this invention is to provide a new and useful continuous process for the manufacture of food casings, wherein the driving out of the fluids produced during the cellulose regeneration step, permits a stable non-interrupted production of tubular casings, that in particular includes continuous extrusion and regeneration.

Another object of the invention is to provide a process for the manufacture of tubular casings, which is efficient, highly reliable and simple to perform, representing a great deal of savings in time, cost and labor when compared with previous methods.

Still another object of the invention is to provide a process which avoids the cumbersome steps carried out for venting fluids from cellulose tubular casings, during the regeneration of them, as performed in prior art.

Yet another object of this invention is to provide an improved process which uses a simple arrangement for an annular extrusion die coupled with a mandrel that allows tubular casings remain inflated during all the time and along all its length for driving out fluids during the regeneration, degassing and dehydration, which obviates all disadvantages of previous art.

Still a further object of the this invention is to provide an improved process in which the tubular casing is maintained with a slope during the regeneration process, that permits liquids to flow easily in countercurrent against the direction followed by the tubular casing, which avoids accumulation of liquids and deformations in the tubular casing.

Finally, it is an object of this invention to provide tubular cellulose sausage casings having an internal surface which carried only very few particulates giving the internal surface a very smooth texture and an excellent peelability.

These and other objects of the invention will become apparent when considered in the light of the following description.

SUMMARY OF THE INVENTION

The invention basically relates to a continuous process for the manufacture of tubular casings, which allows for a continuous regeneration with an non-interrupted driving out operation of liquids and gases which are produced during the cellulose regeneration step. The process provides for the elimination of said liquids and gases by means of a continuous driving out operation which is performed at the same time of the coagulating and partial-regeneration step of the cellulose tubular casings. The novel process allows the fluids to exit in a controlled manner and in a counter direction through the interior orifice of an annular extrusion die. Liquids and gases are received in an acid bath pool for further anti-pollution treatment and disposal. The special conditions of this process surprisingly result in casings carrying on their inner surface much less particulates than the best of the so far known casings. The very low number of particulates on their inner surface is the reason for a much better peelability of the casings.

DESCRIPTION OF THE PREFERRED EMBODIMENTS OF THE INVENTION

Figure 1:
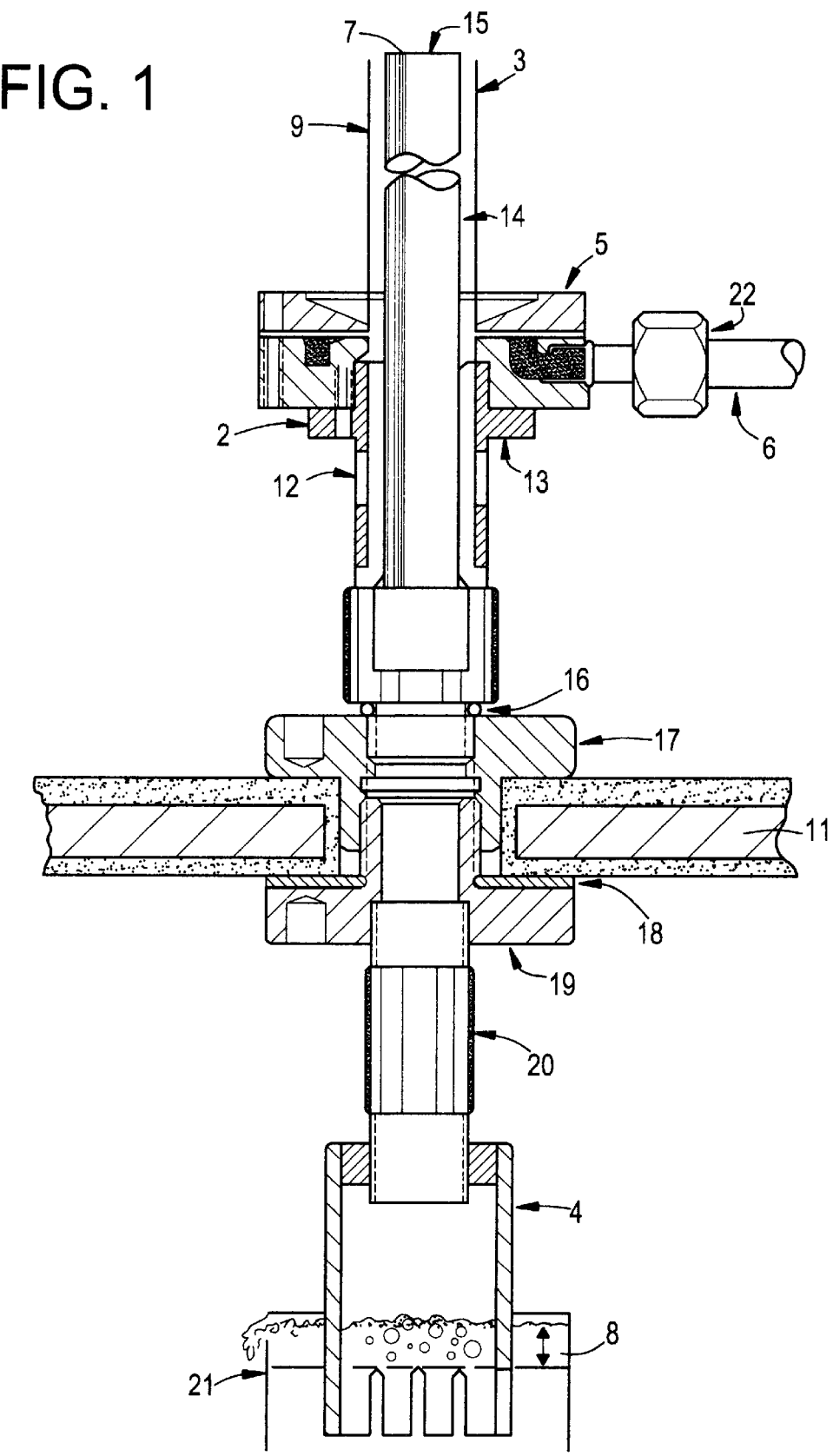
FIG. 1 is a view showing the extrusion die and mandrel arrangement of the present invention.

As previously mentioned, after a conventional alkaline viscose solution is prepared, same is extruded though an annular extrusion die, which is located at the bottom of a coagulation tank containing from about 100 to about 200 grams per liter of sulfuric acid and saturated with sodium sulfate in water, maintained at a temperature from about 35° to about 55° C. By means of this coagulation treatment the alkaline viscose solution is formed into a tubular gel which is maintained straight by means of an internal support tube or mandrel coupled to said die passing down through an internal circular orifice of same and continued by means of another tube or conduit, protruding outside the bottom of the coagulation tank and submerged into a smaller tank filled with acid bath, which constitutes a hydraulic seal.

As soon as the chemical reaction between the alkaline viscose solution and the sulfuric acid and sodium sulfate starts, also starts the formation of carbon disulfide and sulfhydric acid gases which, as previously mentioned, are entrapped within the extruded tubular casing inflating the same. Together with these gases, an important amount of water and acid wash is contained within the casing and same must be released in a controlled manner, mainly because they can make the tubular casing deform and even burst and also because said gases are of a toxic and dangerous nature.

In order to get a controlled continuous and efficient way to vent the above mentioned fluids from the interior of the recently formed tubular casing, a counter flow of same is induced by means of a flattening device located at the end of the coagulation-regeneration step, to prevent said fluids to pass over the following steps of the process and to compel them back in order to drive the same out of the interior of the casing through the lower protruding section of the mandrel and bubbling said fluids into a smaller acid bath tank. These fluids are recovered for further antipollution treatment and later disposal.

Once the coagulation-regeneration step is completed, the tubular casing is passed in flattened condition to a series of water, desulfurizing, water and plastification baths and latter on to a drying step in an inflated condition and finally to a wind up step in flattened condition, as a final step in the manufacture process.

After the complete casing is wound up on reels, said reels are used to feed shirring machines and the casings in shirred state are shipped to the food packer for the processing of the sausage products.

It is assumed that the laminar flow pattern of the spin bath in contact with the internal surface induced by the unique arrangement of the extrusion die, allows for a smooth coagulation process. This originates the smooth texture observed for the internal surface of the casing. Sulfuric acid is consumed gradually during this process.

The smooth texture of the internal surface of the casing obtained by the controlled flow of the spin bath produces an easy peel effect on the final product, that can not be equaled by the processes known in the prior art.

In said processes, a large volume of sulfuric acid solution is forced to pass through the inside of the casing at high velocity, resulting in a coagulation process under this turbulent and non uniform flow. This originates rough textures and heavy deposits of surface particulates on the internal surface.

The present invention will be described in further detail with reference to the enclosed Figures wherein the same numbers are utilized where applicable.

In accordance with FIG. 1, the extrusion die 5 and the attached mandrel 14 are both immersed in a spin bath tank 2 common to all tubular casings. Laminar flow of the spin bath is controlled in order to avoid turbulences that could affect uniformity of the recently formed casing.

Between the tubular casing 9 and the mandrel 14 a thin layer of spin bath 3 is drawn up by the pumping effect of the tubular casing that goes upwards. Thus coagulation of the inside of the tubular casing is carried out.

During this travel, sulfuric acid of the spin bath solution is partially exhausted. Thus the coagulation of the internal wall of the tubular casing is different from the coagulation of the outside wall of the tubular casing, producing an easy peel effect.

Figure 2:
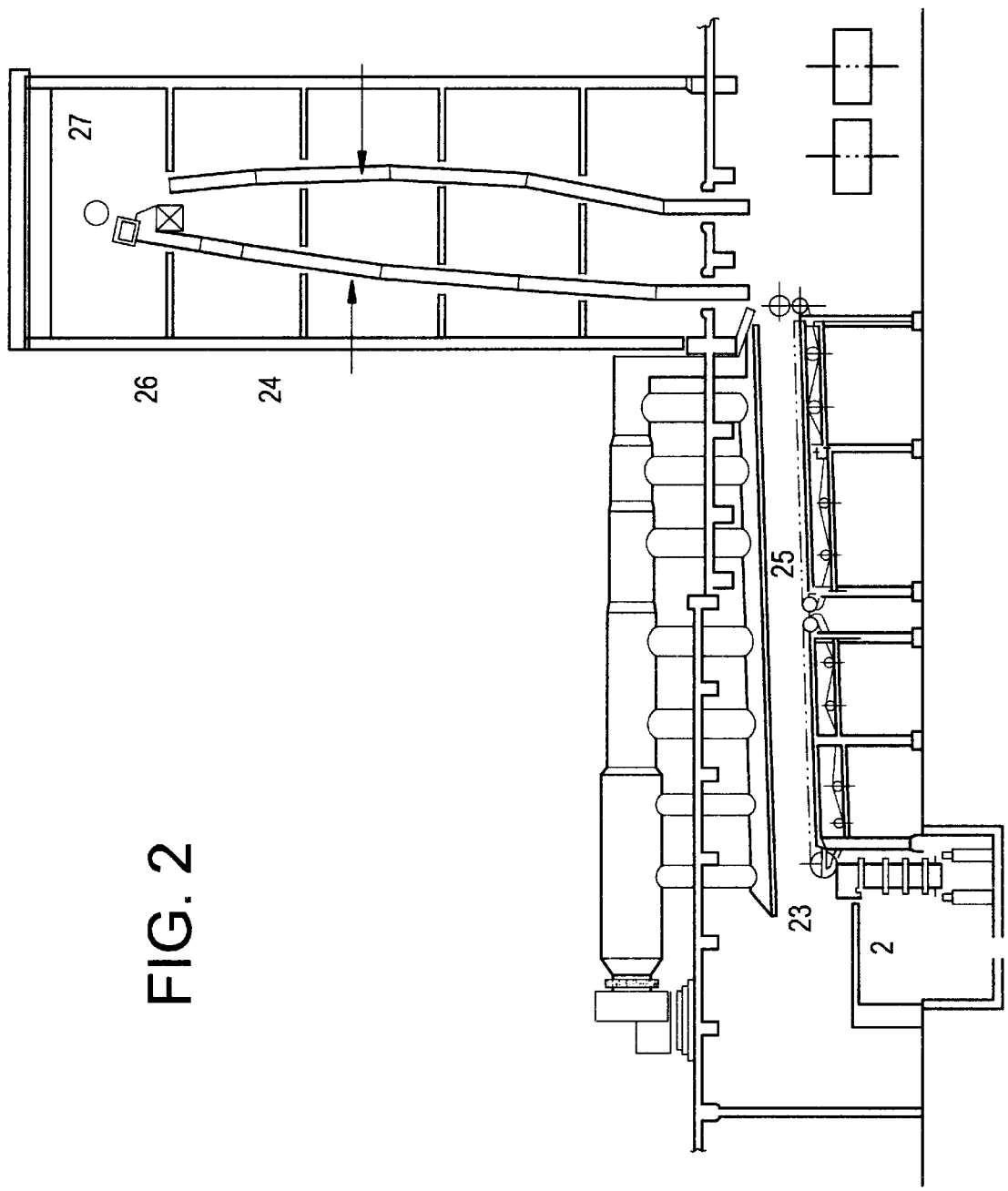
FIG. 2 is a section view of the present invention showing the continuous regeneration process.

Spin bath partially exhausted returns to the scrubber 4 by the mandrel interior joined with gases and liquids that come from top of the continuous regeneration tower 24 of FIG. 2.

Referring to FIG. 1, viscose is fed to the extrusion die 5 by means of a metering pump through a flexible hose 6. At die exit, viscose turns up at 90° angle.

Gases that are produced during coagulation keep the casing inflated allowing the discharge of the same gases and liquids under a controlled manner, through the inside of the mandrel 7. Pressure is very accurately controlled between 5 to 50 millimeters of water, more preferably from 11 to 20 millimeters of water by means of the hydraulic seal 8 at the scrubber. The adjustment can be done by increasing or decreasing the hydrostatic pressure at the hydraulic seal 8. The exhausted spin bath container 21 can be moved up or down depending on the desire pressure in order to obtain the suitable diameter of the casing.

Fresh spin bath is fed to the inside part of the casing through the openings 12 of the Teflon centering guide 13 that keeps concentricity between the spinning die 5 and the mandrel 14.

The viscose hose 6 is fixed to the spinning die 5 by means of a hastelloy connection 22. Liquids and gases return through the inside of the mandrel 7 in the same way then the wasted acid returns 15. A rubber "O" ring 16 is used to adjust the centering guide 13 to the mandrel holder 17. At the bottom of the spin bath tank, there is another holder 19 sealed to the tank by means of a gasket 18.

The purpose of this holder is to affix the exit tube 20 of exhausted acid bath and gases to the bottom of the extrusion tank 11 and to the end of the mandrel 14.

Exhausted spin bath container 21 overflows to the spin bath system.

The new tubular casing formed 9 inflated by means of the reacting gases is sent at an angle of 90° over a screen band 23 of FIG. 2 that has a slope of about 1% to 20%, more preferably of about 3% to 8% and a length from 3 to 18 meters, preferably from 6 to 12 meters. Over this driven band, the same spin bath solution as used in spin bath tank 2, is sprayed over the casing. The temperature of the spin bath ranges from 35° to 55° preferably from 40° to 45°. The purpose of this band is to continue with the regeneration process.

From here, tubular casing passes to a second band 25 in which hot soft water at 65° to 100° C. preferably from 85° to 95° C. is sprayed on it to prewash and to accelerate regeneration., Then the tubular casing passes upwards at about a 90° angle, into the regeneration tower 24 having a height 10 to 25 meters, preferably having 12 to 20 meters, wherein it is heated with steam at 90 to 130° C. preferably at 95 to 120° C. in order to finish regeneration.

The tubular casing is maintained inflated by effect of the gases evolved during coagulation and regeneration, from the spin bath tank 2 to the upper part of the tower inspite of two changes in direction. There is a critical point in the upper part of the tower because dehydration and degassing finish here.

The above conditions and dimensions were used for the design of the machine. If it is wished to increase the extrusion speed, it will also be necessary to change all dimensions of the machine proportionally to the increment to the extrusion speed.

At the upper part of the regeneration tower there are two or more scrapers 26 that close the tubular casing. In this way, gases and liquids are forced in opposite direction to flow back to the scrubber 4 and forced to exit though the hydraulic seal 8.

Immediately after, the tubular casing passes over an upper roll 27, 0.4 to 1.2 meters in diameter more preferably having a diameter from 0.6 to 0.9 meters, on which tubular casing changes direction.

The tubular casing, now in a flat condition, having no liquids nor gases, is then sent on to conventional further processing including washing, desulfurization and plastification.

Figure 3:
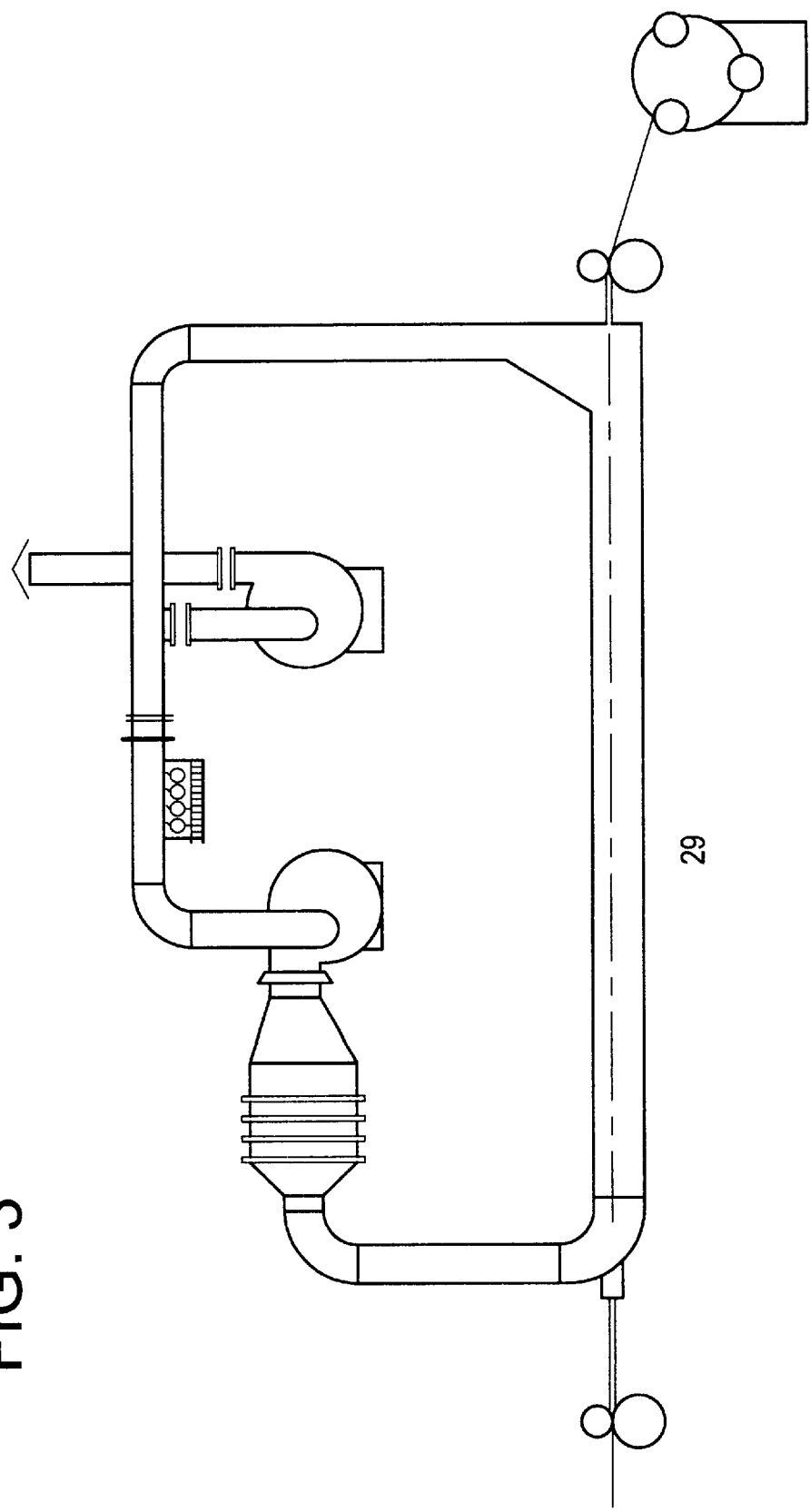
FIG. 3 is a view showing tunnel dryer for drying of tubular casing in an inflated condition.

After plastification, the tubular casing is passed into a tunnel dryer 29 of FIG. 3 wherein it is dried in an inflated condition. In order to obtain a transverse stretching, air pressure that inflates the tubular casing is in the range between 0.2 and 0.8 kilograms per square centimeter and more preferably between 0.3 and 0.6 kilograms per square centimeter. In this way, it is possible to give molecular orientation to cellulose in this sense, and to be able to adjust transverse elongation.

By the above mentioned means it is possible to completely attain all the objects of this invention, however in order to further illustrate the same several examples follow.

EXAMPLE 1

In a continuous process for the manufacture of tubular food casings, a flow of viscose was fed through an annular die, in order to extrude said viscose into a tubular casing to be coagulated and regenerated within an acid bath containing about 140 grams per liter of sulfuric acid and about 400 grams per liter of sodium sulfate, said bath was maintained at a temperature between about 35° and about 55° C.

The annular extrusion die on the bottom of the acid bath tank had a mandrel which length varies depending on the extrusion speed, in this case the length was about of 1.80 m for an extrusion speed of about 20 meters per minute. The tubular cellulose casing began to coagulate as soon as it got in contract with this bath and also started to evolve gaseous $H_2S$ and $CS_2$, which trapped inside the casing provoked the inflation of the casing.

As the coagulation and regeneration of the inflated tubular casing continued, more and more gases and liquids were contained in the interior of the same, these fluids were driven out the casing due to the action of a flattening device, which in the example was a roller adapted to change the traveling direction of said casing and therefore imposing a flattening pressure and stretching force sufficient to prevent further travel of the fluids, compelling them back in a counter flow which was driven out through the internal orifice of the mandrel protruding under the acid bath tank, into a smaller deposit containing previously recovered acid bath solution. The level height in this deposit constitutes a hydraulic seal which controlled the back pressure of the vented fluids, which was maintained between about 14 and about 25 water millimeters. All of these fluids were treated with anti-pollution means before they were discarded.

The regenerated casing proceeded to the next steps of water wash, desulfurizing, water wash and plastification, drying and winding up steps and finally to shirring and packaging steps.

EXAMPLE 2

Following the novel process of Example 1, maintaining the same reactants and temperature of the coagulation bath and a new mandrel with a length increased from about 1.8 m to about 2.70 m. was used in order to support a tubular casing extruded with an increased speed of about 26 meters per minute, a satisfactory continuous process was reached with an efficient ejection of the fluids produced during the coagulation-regeneration step.

EXAMPLE 3

Repeating the process of Example 2, but changing the composition of the coagulation bath to about 115 grams per liter of sulfuric acid and about 440 grams per liter of sodium sulfate and increasing the temperature to a range from about 40° to about 50° C. a new increasing in the extrusion speed was attained to about 30 meters per minute and the process proceeded continuously with the satisfactory driving out of the fluids produced during the coagulation regeneration step, which were exhausted as in Example 1.

EXAMPLE 4

Again, following the process as indicated in Example 2, a new increase in the extrusion speed was tested, with a different amount of sulfuric acid in the coagulation bath. The concentration of sulfuric acid was reduced to about 95 grams per liter, the concentration of sodium sulfate was of about 460 grams per liter and the temperature of the coagulation bath was of about 50° C. The new extrusion speed was of about 32 meters per minute and the process performed as in the previous examples reaching a satisfactory venting of fluids.

EXAMPLE 5

Finally, another test was performed with a coagulation bath containing ammonium sulfate and sulfuric acid, together with the same amount of sodium sulfate of Example 1 and maintaining the same operating conditions of said example. The amount of reactants were the following: about 90 grams per liter of sulfuric acid and about 50 grams per liter of ammonium sulfate and the extrusion speed was of about 20 meters per minute. In this example the liquids and gases entrapped within the tubular casing were vented without difficulty through the internal orifice of the mandrel and recovered and treated as in previous examples.

All of the above examples showed that even though the extrusion speeds of the casings were increased from about 20 meters per minute up to about 32 meters per minute, the novel process of the invention performed satisfactorily, therefore it may be considered that it could be possible to reach faster extrusion speeds of casings, perhaps as high as 50 meters per minute and still maintain an efficient fluids venting operation.

The novel process may be used for the continuous manufacture of tubular food casings not being affected of any manner by the type of viscose, the chemical composition of the extrusion bath, the length and diameter of the mandrel, the operational speed of extrusion, etc., or any other variables of the operation.

Because of the above, the novel process of this invention may be used for the manufacture of any kind of cellulosic food casings, affording many advantages and improvements which could not have been reached before.

Although the invention has been described and set forth in some detail, it should be further understood that the same is susceptible of changes, modifications and variations without departing from the scope and spirit of the invention.

I claim:

1. A continuous process for manufacturing tubular food casings comprising the steps of:
    a) extruding an alkaline viscose solution through an annular extrusion die onto a mandrel, the mandrel being located inside the die and having an interior orifice wherein a thin layer of spin bath is drawn up between the mandrel and the tubular casing, wherein the extrusion die and mandrel are submerged within a spin bath, the mandrel extending through the bath into an acid bath tank to create a hydraulic seat;
    b) regenerating the alkaline viscose solution in the spin bath to continuously produce a tubular food casing over the mandrel in a counter flow direction to the bath and generating gases therein;
    c) inducing a countercurrent flow of gases and exhausted spin bath liquids within the casing and mandrel in a direction opposite that of extrusion by means of a flattening device after regenerating the alkaline viscose solution to direct the gases and exhausted spin bath liquids trapped in the casing to the spin bath tank and
    d) passing the tubular casings through a series of water, desulfurizing, water, plastification baths and drying steps, and winding the casing in flattened condition.

2. The process for manufacturing tubular food casings according to claim 1, wherein the mandrel vertically extends through the extrusion die and through the spin bath and is hydraulically sealed, wherein gases and exhausted spin bath liquids trapped in the casing and mandrel are directed to the spin bath tank.

3. The process for manufacturing tubular food casings according to claim 2, wherein the hydraulic seal created between the spin and acid baths is adjusted by increasing or decreasing the hydrostatic pressure at the hydraulic seal.

4. The process for manufacturing tubular food casings according to claim 3, wherein the coagulation bath contains from about 100 to 200 grams per liter of sulfuric acid and is saturated with sodium sulfate or ammonium sulfate in water, maintained at a temperature from about 35° C. to about 55° C.

5. The process for manufacturing tubular food casings according to claim 4, wherein the gases and liquids exhausted though the mandrel are received in the acid bath and later recovered for further anti-pollution treatment and final disposal.

6. The continuous process manufacturing tubular food casings according to claim 5, wherein the extruding is carried out through the extrusion die having an internal tube or mandrel to support the tubular casing and to remove the gases and liquids contained inside the tubular casing.

* * * * *